United States Patent
Fontaine

(10) Patent No.: US 9,908,641 B2
(45) Date of Patent: Mar. 6, 2018

(54) SATELLITE PROPULSION DEVICE ALLOWING PASSIVE ELIMINATION OF PRESSURIZING GAS

(71) Applicant: THALES, Courbevoie (FR)

(72) Inventor: Laurent Fontaine, Cannes la Bocca (FR)

(73) Assignee: THALES, Courbevoie (FR)

( * ) Notice: Subject to any disclaimer, the term of this patent is extended or adjusted under 35 U.S.C. 154(b) by 48 days.

(21) Appl. No.: 14/796,969

(22) Filed: Jul. 10, 2015

(65) Prior Publication Data
US 2016/0016677 A1    Jan. 21, 2016

(30) Foreign Application Priority Data
Jul. 16, 2014    (FR) ...................... 14 01586

(51) Int. Cl.
| | | |
|---|---|---|
| *B64G 1/40* | (2006.01) | |
| *F02K 9/50* | (2006.01) | |
| *B64G 1/10* | (2006.01) | |

(52) U.S. Cl.
CPC .............. *B64G 1/402* (2013.01); *B64G 1/10* (2013.01); *F02K 9/50* (2013.01)

(58) Field of Classification Search
CPC .............. B64G 1/10; B64G 1/402; F02K 9/50
See application file for complete search history.

(56) References Cited

U.S. PATENT DOCUMENTS

| | | |
|---|---|---|
| 3,732,693 A | 5/1973 | Chu |
| 5,158,362 A | 10/1992 | Brauer et al. |
| 2013/0239544 A1 | 9/2013 | Sisk et al. |

FOREIGN PATENT DOCUMENTS

WO    96/26108 A1    8/1996

OTHER PUBLICATIONS

Ley, "Subsystems of Spacecraft", 2008, p. 330.*

* cited by examiner

*Primary Examiner* — William H Rodriguez
*Assistant Examiner* — William Breazeal
(74) *Attorney, Agent, or Firm* — Baker & Hostetler LLP

(57) ABSTRACT

A satellite propulsion system comprises: at least one tank containing a propulsion reagent, and at least one tank containing a pressurizing gas that pressurizes the propulsion reagent, at least one transport means for transporting the pressurizing gas from the pressurizing gas tank to the propulsion reagent tank, the transport means comprising at least one opening allowing a continuous leak-off of pressurizing gas, and at least one device intended, after the satellite has entered operational orbit, to isolate a zone comprising the opening from the rest of the propulsion system.

7 Claims, 3 Drawing Sheets

SATELLITE PROPULSION DEVICE ALLOWING PASSIVE ELIMINATION OF PRESSURIZING GAS

CROSS-REFERENCE TO RELATED APPLICATION

This application claims priority to foreign French patent application No. FR 1401586, filed on Jul. 16, 2014, the disclosure of which is incorporated by reference in its entirety.

FIELD OF THE INVENTION

The invention falls within the scope of satellites and relates more particularly to a satellite propulsion device.

The invention finds a particular application in the field of geostationary satellites.

BACKGROUND

In order to send a satellite into its operational orbit and thereafter ensure that it holds its station for the operational life of the satellite, propulsion means need to be provided. As a general rule, a device comprising at least one tank containing a propellant that is pressurized is used.

What is meant by a "propellant" is a substance used on its own or in combination with other substances and intended to provide energy.

A distinction is made between various types of propellant propulsion devices:
- A bipropellant device comprising two tanks containing the propellants. It further comprises a pressurizing gas tank containing, for example, helium at high pressure, the pressurizing gas pressurizing the propellants.
- A monopropellant device comprising a tank divided into two compartments by a membrane: one compartment containing the propellant, generally hydrazine, and one compartment containing a gas that presses against the membrane so as to pressurize the propellant.
- There are also membraneless monopropellant devices, the structure of which is similar to that of the bipropellant devices.

FIG. 1 is a functional diagram of a bipropellant propulsion device according to the known art.

The bipropellant propulsion device 1 comprises a low-pressure first part 2 and a high-pressure second part 3.

The low-pressure first part 2 notably comprises two propellant tanks 4. In this particular instance, the propellants 5 used contain MMH which is the acronym for monomethylhydrazine and MON the acronym for mixed oxides nitrogen.

The high-pressure second part 3 comprises at least one tank, in this particular instance it comprises two tanks 6 containing a pressurizing gas 7, in this instance helium, the pressurizing gas 7 being at high pressure, around 300 bar, before the satellite enters orbit.

The pressurized helium 7 is injected via pipes 8 and a pressure regulator 9 into the propellant tanks 4 to pressurize the propellants 5, the regulated pressure in the pipes 8 downstream of the pressure regulator 9 being of the order of 20 bar.

In other words, all the pipes 8 situated in the second part 3 upstream of the pressure regulator 9 contain pressurizing gas 7 at high pressure, and the pipes 8 situated in a part 2 downstream of the pressure regulator 9 contain pressurizing gas 7 at low pressure.

In the second part 3, the pressure prior to the launching of the satellite is comprised between 200 and 300 bar. After the operational orbit has been entered, the pressure in the second part 3 is comprised between 30 and 50 bar. Downstream of the pressure regulator 9, the pressure is around 20 bar.

A PV1-NC valve 10 of the nominally "closed" type is positioned between the pressurizing gas tank 6 and the pressure regulator 9. This PV1-NC valve 10 allows pressurizing gas 7 to be conveyed to the pressure regulator 9 when the nozzles 11a, 11b are in operation, notably at the moment that the satellite enters its orbit and its holding station.

The principle of operation of the device according to the known art can be summarized as follows.

While the tanks 4 are being filled with propulsion reagents and the tanks 6 are being filled with pressurizing gas, the PV1-NC valve 10 is in the "closed" position.

Upon the launching of the satellite, the PV1-NC valve 10 is opened, the pressurizing gas 7 is introduced under a pressure of around 20 bar into the propellant tanks 4. The pressurized propellants 5 are then injected into the nozzles 11a, 11b.

The quantities of pressurizing gas 7 and of propulsion reagents 5 needs to be sufficient to serve the launching of the satellite into its operational orbit, to ensure that the satellite holds station in its operational orbit, and to bring the satellite onto its final orbit when the satellite reaches the end of its service life.

These days, satellites at the end of their service life contain residual sources of energy, such as pressurizing gases or propellants.

According to a new LOS (the acronym for "low orbital spatial") regulation that is coming into force in 2020, all energy sources present within a satellite need to be eliminated when the satellite reaches the end of its service life.

A first solution envisaged in order to meet the LOS regulations is to isolate the second part 3, notably, using a PV7-NO valve 12 of the type that is "open" in nominal mode, positioned in such a way as to isolate the first part 2 from the second part 3 when the satellite is in its operational orbit, and to add an operable pyrotechnic valve of the "closed" type at the second part 3.

When the decision to put an end to the operation of the satellite is taken, the pyrotechnic valve of the "closed" type positioned in the second part 3 is actuated in order to discharge all of the remaining pressurizing gas, it being possible for any residual propellants 5 to be discharged via the nozzles 11a; 11b.

However, this solution presents certain disadvantages, notably:
- the addition of an extra approximately 300 g of mass notably corresponding to the pyrotechnic valves and the supports thereof. Now, any excess mass onboard a satellite represents a not-insignificant on-cost.
- the need to test in order to ensure correct operation of the pyrotechnic valve, requiring additional labour.

SUMMARY OF THE INVENTION

The present invention consists in proposing an alternative propulsion system that notably allows the pressurizing gases to be eliminated passively from the propulsion system.

The invention applies particularly to a bipropellant or membraneless monopropellant propulsion device.

According to one aspect of the invention there is proposed a satellite propulsion system comprising:
at least one tank containing a propulsion reagent, and at least one tank containing a pressurizing gas that pressurizes the propulsion reagent, at least one transport means for transporting the pressurizing gas from the pressurizing gas tank to the propulsion reagent tank, the transport means comprising at least one opening allowing a continuous leak-off of pressurizing gas, and at least one device intended, after the satellite has entered operational orbit, to isolate a zone comprising the opening from the rest of the propulsion system.

The invention notably allows the pressurizing gases to be discharged passively without operator intervention.

In one embodiment, the pressurizing gas transport means further comprises a pressure regulator, the opening being situated downstream of the pressure regulator.

Alternatively, the opening is situated upstream of the pressure regulator.

Advantageously, the diameter of the opening is comprised between 1 and 20 microns and is preferably equal to 11 microns.

This order of magnitude of the diameter of the opening allows the pressurizing gas to be eliminated slowly and continuously throughout the operating life of the satellite, and possibly for a few years after the satellite has been scrapped without impeding the launch, entry into orbit, holding station in operational orbit and entry into final orbit or graveyard orbit at the end of its life.

In one embodiment, the opening is connected to the outside of the propulsion system.

In another embodiment, the opening is connected to the propulsion reagent tanks.

BRIEF DESCRIPTION OF THE DRAWINGS

The invention will be better understood from reading the description given by way of examples. The description makes reference to the accompanying drawings in which.

DETAILED DESCRIPTION

Figure 1:
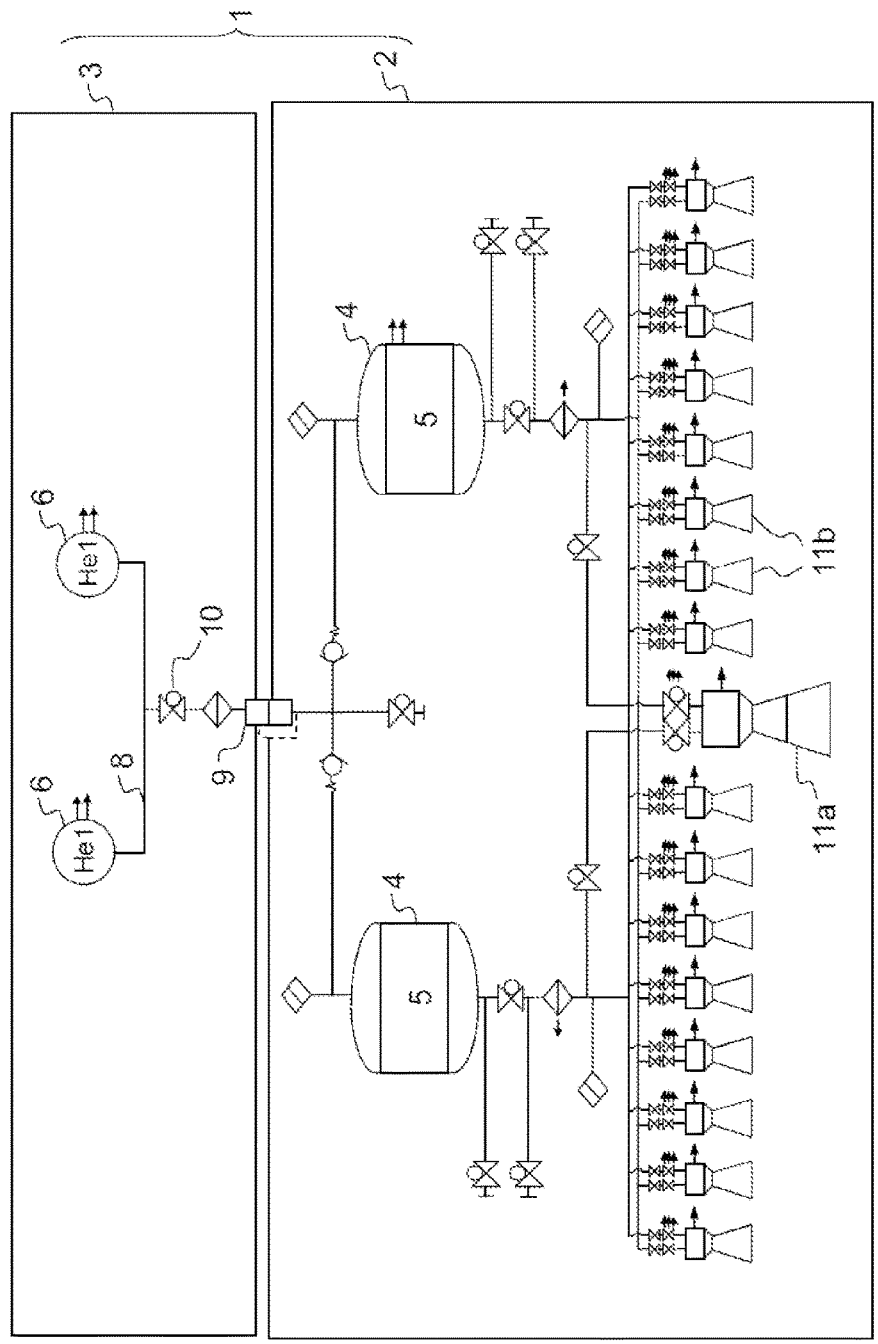
FIG. 1, already described, schematically depicts a propulsion device of the bipropellant type, according to the known art, FIG. 2 schematically depicts one embodiment of the propulsion system of bipropellant type, according to one aspect of the invention.
Figure 2:
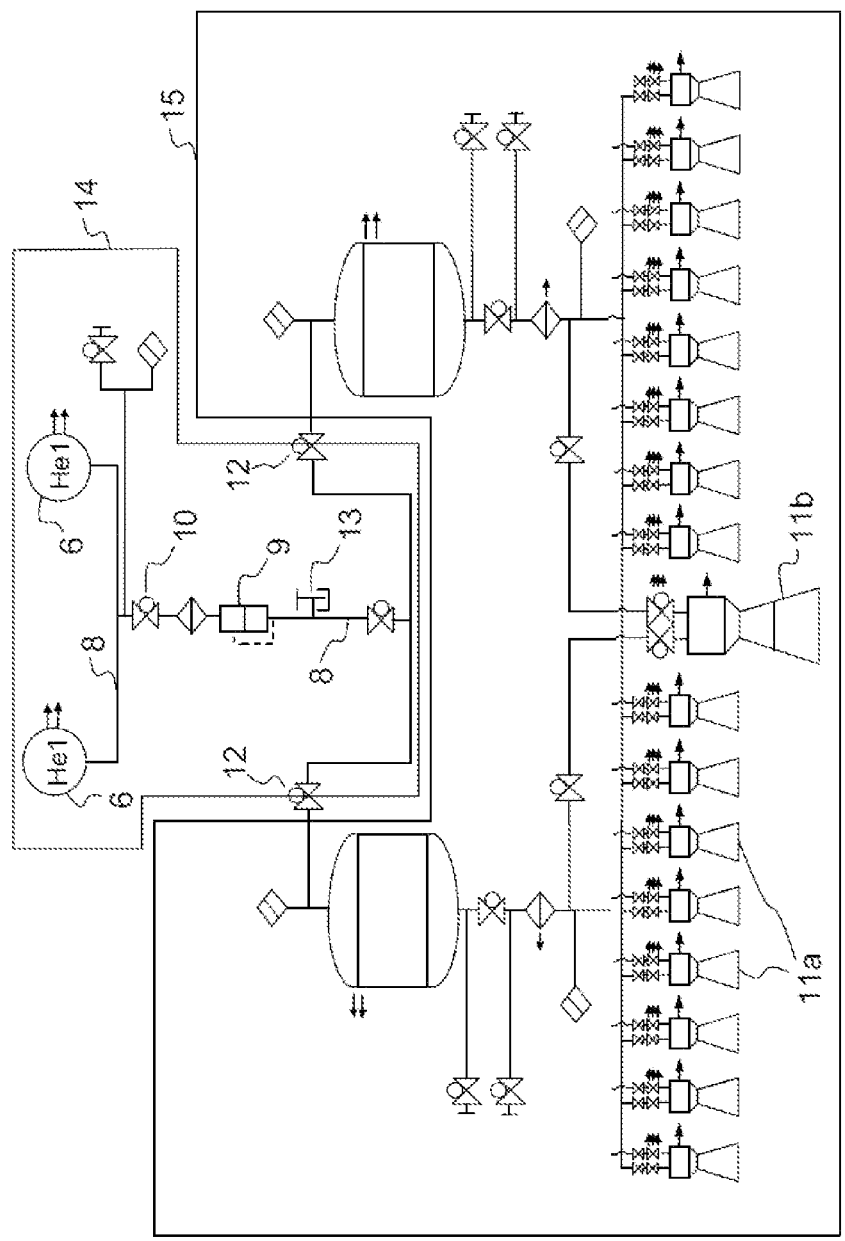

FIG. 2 depicts one embodiment of a propulsion system according to the invention.

The propulsion system comprises:

two pressurizing gas tanks 6, a pressure regulator 9 and a PV1-NC valve 10 positioned between the pressure regulator 9 and the pressurizing gas tanks 6, two propellant tanks 4 and the nozzles 11a, 11b, pressurizing gas transporting means such as pipes 8, the pipes having at least one opening 13 allowing a continuous leak off of gas, and a device 12 for isolating a zone 14 comprising the opening 13, it being possible for the device to be at least one PV7-NO valve 12. In this particular instance, the zone 14 notably comprises the gas tanks 6, the pressure regulators 9.

In practice, the opening 13 according to the invention may take the appearance of a T-shaped branch-off of one of the pipes 8 through which the pressurizing gas 7 circulates, one of the mouths of the branch-off being surmounted by a plug that has an opening 13 calibrated to allow a slow and continuous leak off of pressurizing gas.

To sum up, the invention consists in making an opening 13 in such a way as to discharge the pressurizing gas 7 throughout the service life of the satellite so that the residual pressure $P_{Res}$ of propulsion gas at the end of use of the satellite is below a threshold value $P_S$ that complies with the LOS regulations without thereby impeding or preventing the satellite from being launched or kept in its orbit, the threshold value $P_S$ being of the order of 2 bar, and preferably of 0.20 bar.

In another embodiment, the zone 14 comprises only the opening 13, the opening 13 being connected to the outside of the propulsion system 1.

In another embodiment, the zone 14 further comprises the propellant tanks 4 and the opening 13 is connected to the tanks 4 allowing the propellants 5 to be pressurized and the performance of the nozzles 11a; 11b to be maintained. The zone 14 comprising the opening 13 and the propellant tanks 4 is therefore adequately isolated from the rest of the propulsion system 1.

The opening 13 is situated upstream of the pressure regulator 9 or downstream of the pressure regulator 9. When the opening 13 is situated upstream of the pressure regulator, the opening 13 needs to be strong enough that any tearing of the walls of the opening under the effect of the pressure of around 200 to 300 bar is avoided, notably at the beginning of the entry into service of the satellite. By contrast, when the opening 13 is situated downstream of the pressure regulator 9, the pressure applied to the walls of the opening 13 is not so great; it is limited to around 20 bar.

The opening 13 is of any cross section. Advantageously, the cross section of the opening 13 is circular.

When the opening 13 is situated downstream of the pressure regulator 9, the diameter of the opening 13 is comprised between 1 and 20 microns and preferably 11 microns. The value of the diameter of the opening 13 is the result of a compromise between the rate at which pressurizing gas 7 leaks such that the residual pressure $P_{Res}$ of pressurizing gas is below the threshold value $P_S$ at the end of operation of the satellite, and the need to maintain a minimum pressure in the second zone 2 so as to allow the propulsion device 1 to perform its function of allowing the satellite to hold station until it is scrapped. In other words, the leak-off of propulsion gas 7 needs to be great enough that the residual quantity of gas at the end of the service life of the satellite meets the LOS regulations. In order not to impede the sending of the satellite into its operational orbit and the ability of the satellite to hold station, namely the ability of the nozzles 11a, 11b to remain operational throughout the operation life of the satellite, the leak must nevertheless not to be too great.

When the opening 13 is positioned downstream of the pressure regulator 9, a circular opening 13 with a diameter of 11 microns causes a reduction in pressure estimated at around 5 to 30 bar in the pressurizing gas tank 6 over the first fifteen days corresponding to the entering of orbit. This loss in pressure is considered to be a reduction that is acceptable in terms of the impact it has on sending the satellite into orbit and ensuring it holds station. At the end of the service life of the satellite, which means approximately fifteen years after it entered orbit, the estimated residual pressure of the pressurizing gas 7 is below 0.2 bar.

The principle of operation of the propulsion system according to the invention described hereinabove can be summarized as follows.

Before the launch of the satellite, the pressurizing gas tanks 6 are filled with pressurizing gas, the pressure of the pressurizing gas 7 is around 300 bar. The PV1-NC valve 10 is in the closed position, the gas 7 is not injected into the propulsion reagent tanks 4.

Upon launch of the satellite, the PV1-NC valve 10 is opened, the gas is injected into the propellant tank 4.

Once the satellite is holding station, the pressure in the pressurizing gas tank 6 is comprised between 30 and 50 bar. The PV7-NO valve 12 is closed allowing the zone 14 comprising the openings 13 to be isolated. The PV1-NC valve 10 remains in the open position allowing the pressurizing gas 7 to escape via the opening 13.

In one embodiment of the invention, the pressurizing gas 7 may be discharged to outside the propulsion system 1 or reinjected into the propellant tanks 4 in order to pressurize the propellants 5 for a subsequent use of the nozzles 11a, 11b.

In another mode of operation, the opening 13 may be made up of two or even a plurality of openings 13 arranged in opposition so as to avoid creating thrusts that would disturb the course of the satellite.

Figure 3:
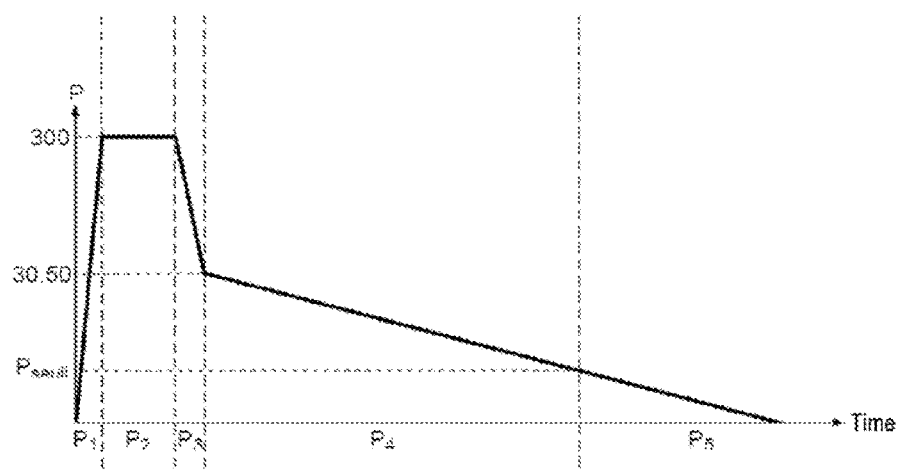
FIG. 3 depicts how the helium pressure in a pipe situated upstream of the pressure regulator changes, according to one aspect of the invention.

FIG. 3 depicts how the pressure inside a pipe upstream of the pressure regulator changes during operational service of the propulsion device according to the invention.

In this particular instance, the opening 13 is positioned downstream of the pressure regulator 9.

A first period P1 corresponds to the period of filling of the pressurizing gas tank 4, the PV1-NC valve 10 being in the "closed" position. During this period, the pressure increases rapidly to reach a pressure of around 300 bar.

A second period P2 corresponds to a period of latency between the end of filling of the pressurizing gas tank 4 and the start of bringing the satellite into its operational orbit. As the PV1-NC valve 10 is still in the "closed" position, no drop in pressure is observed.

A third period P3 lasting approximately 15 days corresponds to the satellite taking up station. During this step, the PV1-NC valve 10 is activated into the "open" position and the PV7-NO valve 12 is inactive in the "open" position.

This step of entering orbit requires a large amount of pressurized propellant 5 requiring a large quantity of helium. The helium pressure in the high-pressure zone 13 decreases sharply to reach a value of between 30 and 50 bar. During this third period, the leak off of pressurizing gas 7 via the opening 13 is in effect.

However, the reduction in helium pressure associated with the satellite getting into position is such that the reduction in helium pressure via the opening 13 appears as negligible.

A fourth period P4 corresponds to the operating life of the satellite, this period generally lasting between 15 and 20 years. During this fourth period P4, the pressure of the pressurizing gas 7 decreases at a slope that is more shallow than the reduction observed while the satellite was getting into position until it reaches a minimal value, the reduction corresponding to the leak off of pressurizing gas 7 according to the invention.

The fifth period P5 corresponds to the end of service of the satellite, part of the minimum pressure notably being used to place the satellite in its final orbit, the residual pressure after the satellite has entered its final orbit at the end of its service life is below a threshold pressure $P_S$ defined by the LOS regulations. Remaining pressurizing gas continues to escape slowly and continuously via the opening 13.

The invention claimed is:

1. A satellite propulsion system for a satellite, the propulsion system comprising: at least one
    at least one propulsion reagent tank containing a propulsion reagent, and at least one pressurizing gas tank containing a pressurizing gas that pressurizes the propulsion reagent, and
    at least one transport means for transporting the pressurizing gas from the at least one pressurizing gas tank to the at least one propulsion reagent tank, the at least one transport means comprising at least one opening, wherein the at least one opening leaks off pressurizing gas whenever the pressurizing gas is provided to the at least one propulsion reagent tank, and
    at least one device, after the satellite has entered operational orbit, to isolate a zone comprising the opening from the rest of the propulsion system.

2. The satellite propulsion system according to claim 1, in which the at least one transport means further comprises a pressure regulator, the opening being situated downstream of the pressure regulator.

3. The satellite propulsion system according to claim 1, in which the at least one transport means further comprises a pressure regulator, the opening being situated upstream of the pressure regulator.

4. The satellite propulsion system according to claim 1, in which the diameter of the at least one opening is comprised between 1 and 20 microns.

5. The satellite propulsion system according to claim 4, in which the diameter of the at least one opening is equal to 11 microns.

6. The satellite propulsion system according to claim 1, in which the at least one opening is connected to outside of the propulsion system.

7. The satellite propulsion system according to claim 1, in which the opening is connected to the at least one propulsion reagent tank.

* * * * *